(12) United States Patent
Billon et al.

(10) Patent No.: US 12,552,536 B2
(45) Date of Patent: Feb. 17, 2026

(54) DEVICE FOR HOLDING OBJECTS IN AN AIRCRAFT CABIN AND ASSOCIATED METHOD FOR HOLDING

(71) Applicant: DASSAULT AVIATION, Paris (FR)

(72) Inventors: Jean-Rémi Billon, Saint Cloud (FR); Quentin Dugas, Saint Cloud (FR); Grégory Lefloch, Little Rock, AR (US); Maxime Nicot, Saint Cloud (FR)

(73) Assignee: DASSAULT AVIATION, Paris (FR)

( * ) Notice: Subject to any disclaimer, the term of this patent is extended or adjusted under 35 U.S.C. 154(b) by 145 days.

(21) Appl. No.: 18/198,263

(22) Filed: May 16, 2023

(65) Prior Publication Data
US 2023/0373629 A1  Nov. 23, 2023

(30) Foreign Application Priority Data
May 17, 2022 (FR) ..................... 22 04670

(51) Int. Cl.
*B64D 11/00* (2006.01)
*F16M 11/04* (2006.01)
*F16M 13/02* (2006.01)

(52) U.S. Cl.
CPC ............ *B64D 11/00* (2013.01); *F16M 11/04* (2013.01); *F16M 13/022* (2013.01); *F16M 2200/021* (2013.01)

(58) Field of Classification Search
CPC ............ A47G 23/0225; A47G 23/0216; A47G 23/0208; A47G 23/02; B64D 11/00; B64D 11/0007; F16M 11/04; F16M 13/022; F16M 2200/021
USPC .......... 248/310, 311.2, 318, 346.01, 346.03, 248/346.04, 346.06
See application file for complete search history.

(56) References Cited

U.S. PATENT DOCUMENTS

| | | | | |
|---|---|---|---|---|
| 4,620,685 A * | 11/1986 | Taguchi | ............... | B65D 23/001 220/628 |
| 5,029,720 A * | 7/1991 | Bridges | .............. | A47G 23/0225 224/406 |
| 5,170,980 A * | 12/1992 | Burrows | ................ | B60N 3/101 224/483 |
| 8,272,523 B1 * | 9/2012 | DeMusis, Sr. | ......... | B65D 25/24 215/393 |
| 8,757,572 B1 * | 6/2014 | Starr | ...................... | B60N 3/108 248/314 |
| 10,292,514 B1 | 5/2019 | Kuhn et al. | | |
| 11,766,144 B2 * | 9/2023 | Kraus | ................ | A47G 23/0225 248/346.03 |

(Continued)

FOREIGN PATENT DOCUMENTS

EP  2808593 B1  8/2017

*Primary Examiner* — Alfred J Wujciak
(74) *Attorney, Agent, or Firm* — Davidson Kappel LLC

(57) ABSTRACT

A device for holding objects in an aircraft cabin includes at least one interface, intended for being attached to a wall of the cabin, or for being formed in a wall of the cabin, the interface defining an attachment region for the object, the object being suitable for being placed in contact with the attachment region. The object can be rotated over the attachment region between a position for placing the object on the attachment region, wherein the object can be moved away from the attachment region, and an attachment position of the object on the attachment region, wherein the object is held on the attachment region.

14 Claims, 10 Drawing Sheets

(56) References Cited

U.S. PATENT DOCUMENTS

| | | | |
|---|---|---|---|
| 2006/0249520 A1* | 11/2006 | DeMonte | A47G 23/0225 |
| | | | 220/737 |
| 2021/0345805 A1 | 11/2021 | Keast | |
| 2023/0173969 A1* | 6/2023 | Tuttle | B60N 3/103 |
| | | | 248/311.2 |
| 2024/0000255 A1* | 1/2024 | Wickham | A47G 23/0225 |

* cited by examiner

DEVICE FOR HOLDING OBJECTS IN AN AIRCRAFT CABIN AND ASSOCIATED METHOD FOR HOLDING

The present disclosure relates to a system for holding objects in an aircraft cabin, including:
- at least one interface, intended for being attached to a wall of the cabin, or for being formed in a wall of the cabin, the interface defining a region for attaching the object, the object being suitable for being placed in contact with the attachment region.

BACKGROUND

Such a device is intended in particular for being placed in an aircraft cabin of a business aircraft, for securing objects, in particular during phases of movement of the aircraft, such as taxiing, take-off, cruising and landing.

The objects are e.g. accessory holders, such as a hollow support intended for receiving a container, in particular a glass, a bottle or a cup, or yet a holder for a portable electronic device, in particular a mobile phone or a tablet. In a variant, the objects are accessories as such.

During a passenger's stay in an aircraft cabin, the passenger, very often, has to handle objects, in particular accessories such as defined above. However, when the aircraft is in motion, such objects must be held in position when the user is not handling them, so as to prevent the objects from falling or flying.

To this end, a lateral console with an upper wall for placing objects is provided e.g. in certain business aircraft, next to the passenger seats. Hollow nests are sometimes provided in the upper wall for receiving e.g. a glass, a bottle or a mobile telephone. Such nests are generally cylindrical.

The nests are often rather unaesthetic and limit the volume available in the unit. Because of the geometry thereof, the nests hold the object to a certain, yet imperfect, extent. Thus, during taxiing, take-off, or landing phases, procedures generally require that the objects contained in the nests be stowed away by the passenger, to prevent the passenger from being injured.

The above is tedious and rather uncomfortable, especially if the passenger wants to continue using the objects during such phases.

One aim of the present disclosure is to obtain a device for holding objects which is compact, aesthetic, and which nevertheless provides a robust attachment of objects in an aircraft cabin, in particular for holding the objects during taxiing, take-off or landing phases.

SUMMARY

To such end, the subject matter of the present disclosure is a holding device of the aforementioned type, characterized in that the object is mobile in rotation on the attachment region, between an installation position for placing the object on the attachment region, in which the object is movable away from the attachment region, and an attachment position of the object on the attachment region, in which the object is held on the attachment region.

The system according to the present disclosure can comprise one or a plurality of the following features, taken individually or according to any technically possible combination:
- the rotation of the object between the installation position and the attachment position is at least 20°, and is comprised in particular between 70° and 120°;
- the object has a flat bottom surface, the interface having a flat attachment region, the object being rotated by sliding the bottom surface on the attachment region;
- the interface includes a first interference surface protruding from the attachment region, a second interference surface protruding from the attachment region, situated opposite and away from the first interference surface, the object having a peripheral surface with, in the attachment position, a first contact region with the first interference surface and a second contact region with the second interference surface, the first contact region and the second contact region being arranged away from the first interference surface and from the second interference surface in the installation position;
- the peripheral surface comprises at least one section having an outer contour with an elongated shape along an axis of elongation, the axis of elongation running through the first contact region and through the second contact region;
- the peripheral surface has at least one section with a deformable contour, the contour being deformed at the first contact region and at the second contact region in the attachment position;
- the object comprises an annular seal defining in part, the peripheral surface defining the deformable contour of the peripheral surface;
- the interface has a bottom defining the attachment region, and a ledge protruding with respect to the bottom, the ledge defining the first interference surface and the second interference surface;
- the ledge delimits at least one groove and a protruding part covering the groove, at least one of the first contact regions being inserted into the groove under the protruding part in the attachment position and being situated outside of the groove in the installation position;
- the interface includes a first magnetic interaction zone including a first permanent magnet and/or a first zone configured to be magnetized by a permanent magnet, the object having at least a second magnetic interaction zone, the second magnetic interaction zone including a second permanent magnet, or a second zone configured to be magnetized by a permanent magnet, the overlap between the first magnetic interaction zone and the second magnetic interaction zone being minimal or zero in the installation position, the overlap between the first magnetic interaction zone and the second magnetic interaction zone being maximum in the attachment position;
- the first magnetic interaction zone extends along a first longitudinal axis, the second magnetic interaction zone(s) extending along a second longitudinal axis, the longitudinal axis of the first magnetic interaction zone and the axis of the second magnetic interaction zone(s) being coincident in the attachment position and intersecting in the installation position;
- the object is an accessory holder, such as a hollow receptacle or a disk, or the object is an accessory, in particular chosen from a glass, a bottle, a cup, a lighting device, a portable electronic device, such as a mobile phone or a tablet.

A further subject matter of the present disclosure is an aircraft cabin including a wall and a holding system as defined hereinabove, the interface being attached to the wall or being formed in the wall.

The cabin according to the present disclosure can comprise the following feature:
- a side console, the wall being present on the side console.

A further subject matter of the present disclosure is a method for holding an object in an aircraft cabin, including the following steps:

- providing a holding system for objects, as defined hereinabove;
- moving an object in contact with the attachment region, in the installation position;
- rotating the object from the installation position to the attachment position, the object being then held on the attachment region.

BRIEF SUMMARY OF THE DRAWINGS

The present disclosure will be better understood upon reading the following description, given only as an example and made in reference to the enclosed drawings, wherein.

DETAILED DESCRIPTION

Figure 1:
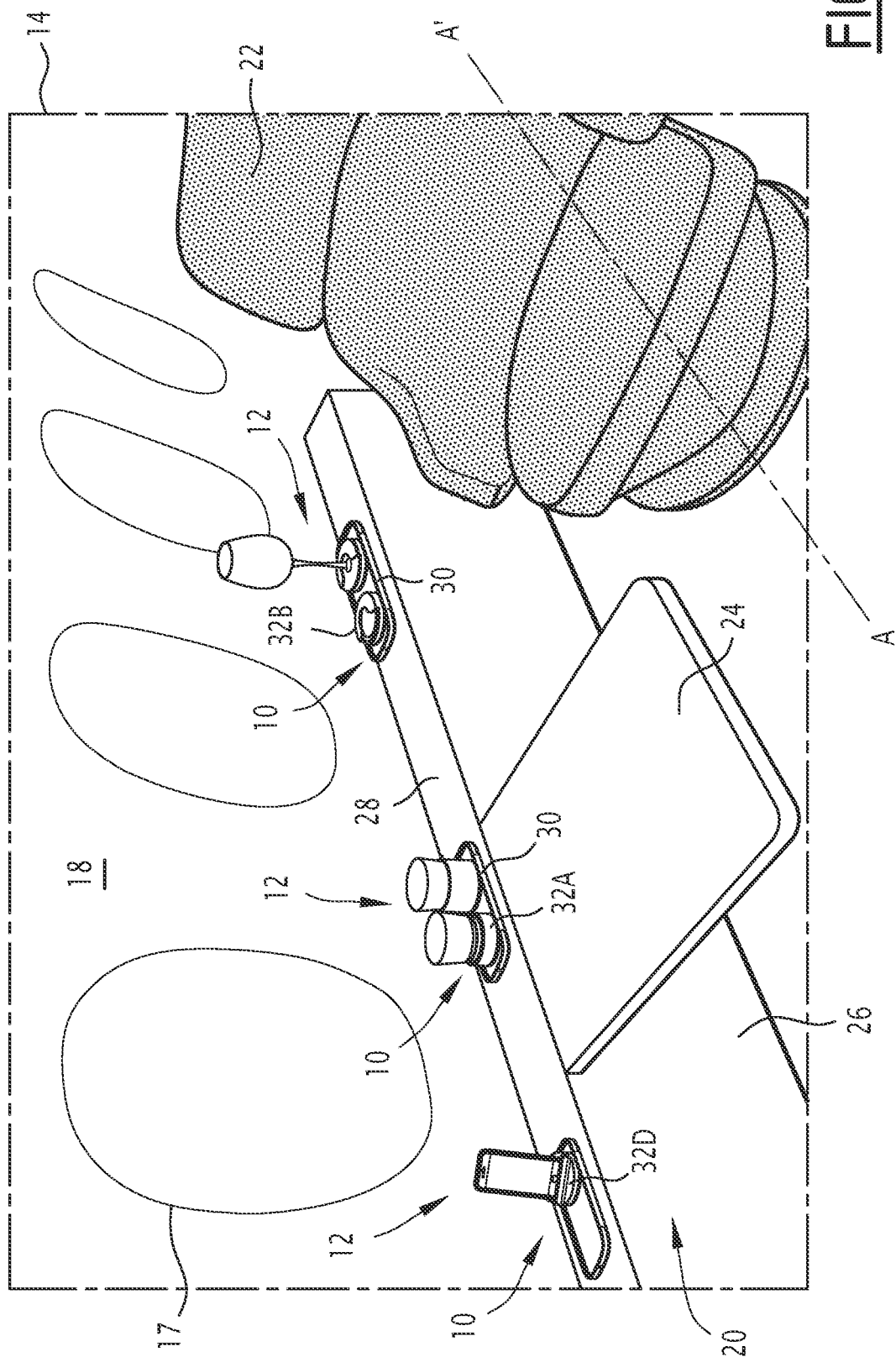
FIG. 1 is a schematic perspective view of a first aircraft cabin according to the present disclosure, equipped with a holding system for objects.

A first system 10 for holding objects 12 in an aircraft cabin 14 is illustrated in FIGS. 1 to 5.

The cabin 14 is delimited within a fuselage extending along a longitudinal axis A-A' of the aircraft, the fuselage being provided with windows 17.

The cabin 14 includes an interior trim 18 arranged in the fuselage. It advantageously comprises a lateral unit 20 arranged along the fuselage, at least one seat 22, and at least one table 24, protruding with respect to the unit 20.

The unit 20 includes a lateral wall 26 and an upper wall 28, the holding device 10 being herein arranged on the upper wall 28.

In the present example, the seat 22 extends longitudinally in the cabin 14. The table 24 extends transversely with respect to the axis A-A', from the lateral unit 20, opposite the seat 22. The table 24 is e.g. retractable into the lateral unit 20.

The holding device 10 includes an interface 30, either attached or formed in the wall 28, and at least one object, herein at least one accessory holder 32A, 32B, attached reversibly to the interface 30.

With reference to FIGS. 2 to 5, the interface 30 comprises a bottom 40 attached or formed in the wall 28 and a peripheral ledge 42 protruding with respect to the bottom 40, at the periphery of the bottom 40.

The interface 30 advantageously further comprises an inner covering 44 arranged on the bottom 40.

The bottom 40 has herein an elongated shape, in particular an oblong shape. In the present particular example, the bottom 40 extends parallel to the longitudinal axis A-A'.

The bottom 40 provided, if appropriate, with the inner covering 44, defines at least one region 46 for attaching an object 12 to the interface 30.

The ledge 42 protrudes from the periphery of the bottom 40. It has a first longitudinal section 50A and a second longitudinal section 50B, arranged parallel to each other and at a distance from each other.

The ledge 42 further includes two end sections 52C, 52D which have herein a curved shape, e.g. C-shaped, connecting the ends of the longitudinal sections 50A, 50B to one another.

The longitudinal sections 50A, 50B each have a groove 53A, 53B having a bottom delimiting a first surface 54A of interference with the object 12 and a second surface 54B of interference with the object 12, respectively, situated opposite and at a distance from each other, at the attachment region 46. The first interference surface 54A and the second interference surface 54B are herein vertical and parallel to each other.

The groove 53A, 53B advantageously extends from the bottom 40 over part of the height of the ledge 42. The ledge 42 has a protruding part 55A, 55B which closes the groove 53A, 53B upwardly, facing the bottom 40.

The accessory holder 32A, 32B is intended for supporting at least one accessory 62 intended for being taken by the user. It extends about vertical central axis B-B'.

In the example shown in FIGS. 2 to 5, the accessory 62 is a glass, a cup or a bottle intended for containing a liquid, in particular a beverage, intended for the being consumed by a passenger.

The accessory holder 32A, 32B includes a hollow receptacle 64 defining a lower surface 66 intended for pressing against the attachment region 46 and an outer peripheral surface 68, intended for coming into contact with the first interference surface 54A and with the second interference surface 54B in at least one attachment position.

In the present example, the receptacle 64 includes at least one bottom wall 70 and one side wall 72 protruding with respect to the bottom wall 70. It further includes a deformable annular seal 74 received in an annular housing provided in the outer peripheral surface 68 in the vicinity of the lower surface 66.

The bottom wall 70 delimits the bottom surface 66, which is herein a flat surface.

The side wall 72 and the seal 74 delimit the outer peripheral surface 68.

Figure 3:
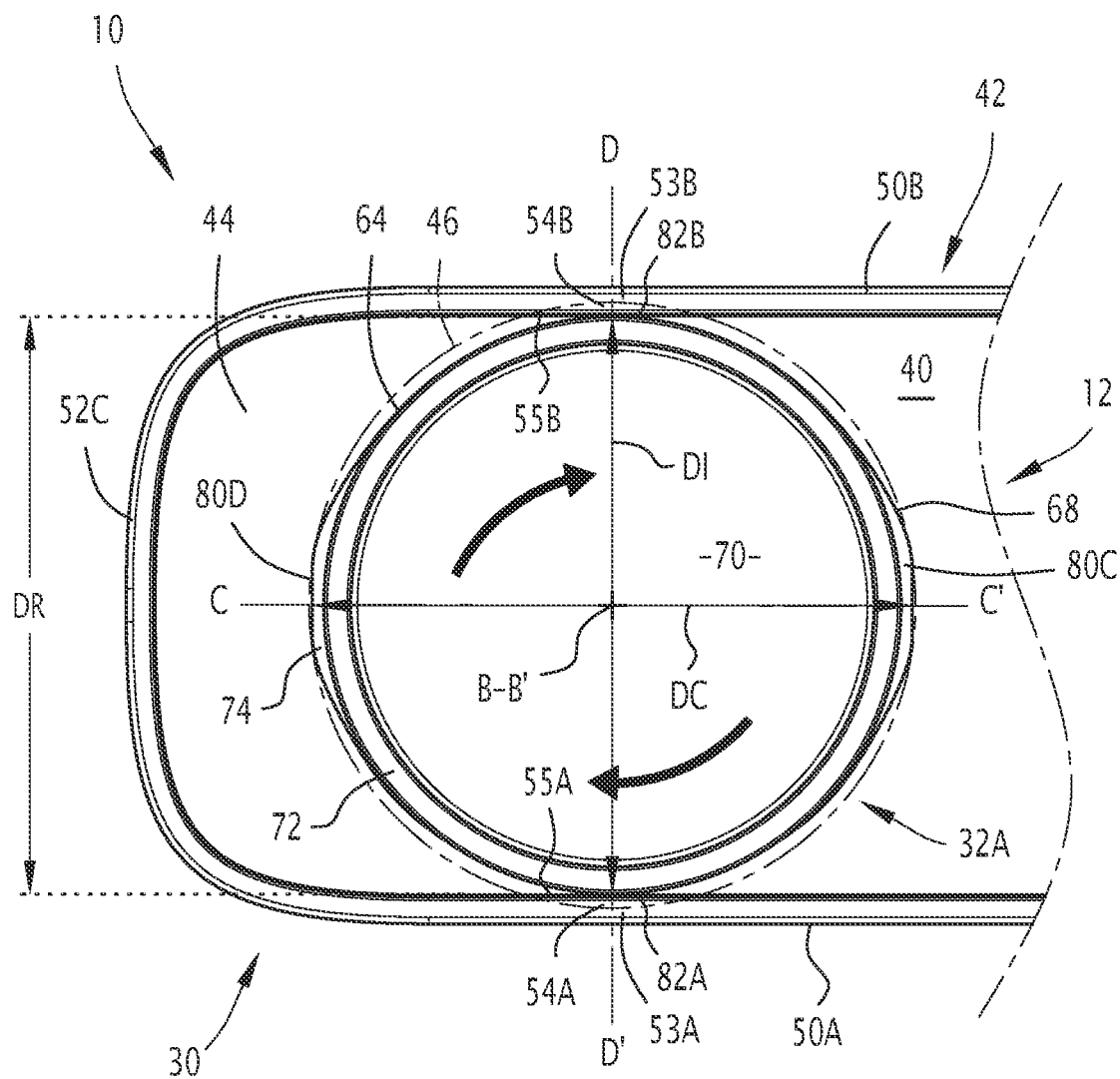
FIG. 3 is a view of an object inserted into an interface of the holding system, with the object in an installation position.

As can be seen in FIG. 3, in projection in a plane perpendicular to the central axis B-B' of the accessory holder 32A, 32B, the outer peripheral surface 68 has an outer contour elongated along an axis of elongation C-C'. The contour is advantageously defined by the seal 74 and is thus deformable.

The elongated contour has e.g. the shape of an ellipse or of a pseudo-ellipse having a major axis along the axis of elongation C-C' of the outer contour, and a minor axis along an axis D-D' perpendicular to the axis of elongation C-C'.

The outer contour thus defines a first contact region 80C with the interface 30 and a second contact region 80D with the interface 30, situated opposite the first contact region 80C with respect to the axis B-B'. In projection in the plane perpendicular to the central axis B-B', the axis of elongation C-C' intersects the first contact region 80C and intersects the second contact region 80D.

The outer contour of the peripheral surface 68 further has, between the contact regions 80C, 80D, a first insertion region 82A into the interface 30 and a second insertion region 82B into the interface 30 situated opposite the first insertion region 82A with respect to the axis B-B', the insertion regions 82A, 82B being dimensioned for the insertion of the accessory holder 32A, 32B into the interface 30.

The axis D-D' perpendicular to the longitudinal axis C-C' intersects the first insertion region 82A and intersects the second insertion region 82B.

When the accessory holder 32A, 32B is arranged at a distance from the interface 30, the maximum distance DC defined between the contact regions 80C, 80D, taken along the axis C-C', is greater than the minimum distance DR separating the protruding parts 55A, 55B facing each other in the interface 30.

Similarly, the maximum distance DI separating the insertion regions 82A, 82B, taken at the axis D-D', is less than or equal to the distance separating the protruding parts 55A, 55B facing each other in the interface 30.

Figure 2:
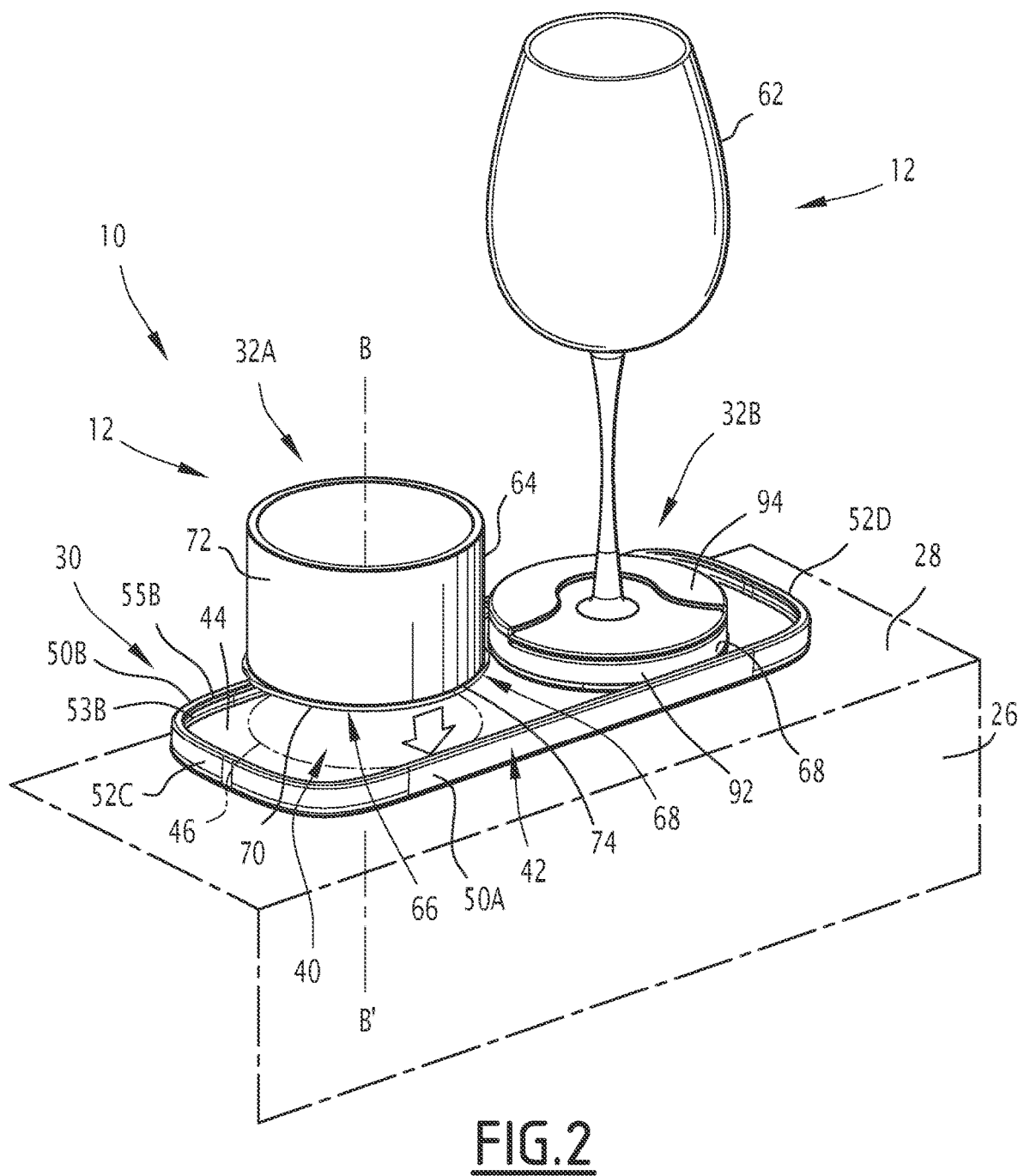
FIG. 2 is a perspective view of a detail of FIG. 1.

Thereby, as illustrated in FIG. 2, the accessory holder 32A, 32B is suitable for being inserted into the interface 30, in order to place the lower surface 66 thereof in contact with the attachment region 46. The above is done by placing the insertion regions 82A, 82B facing the first interference surface 54A and the second interference surface 54B, respectively, between the facing protruding parts 55A, 55B. The accessories holder 32A, 32B thereby occupies an installation position in the interface 30.

Figure 5:
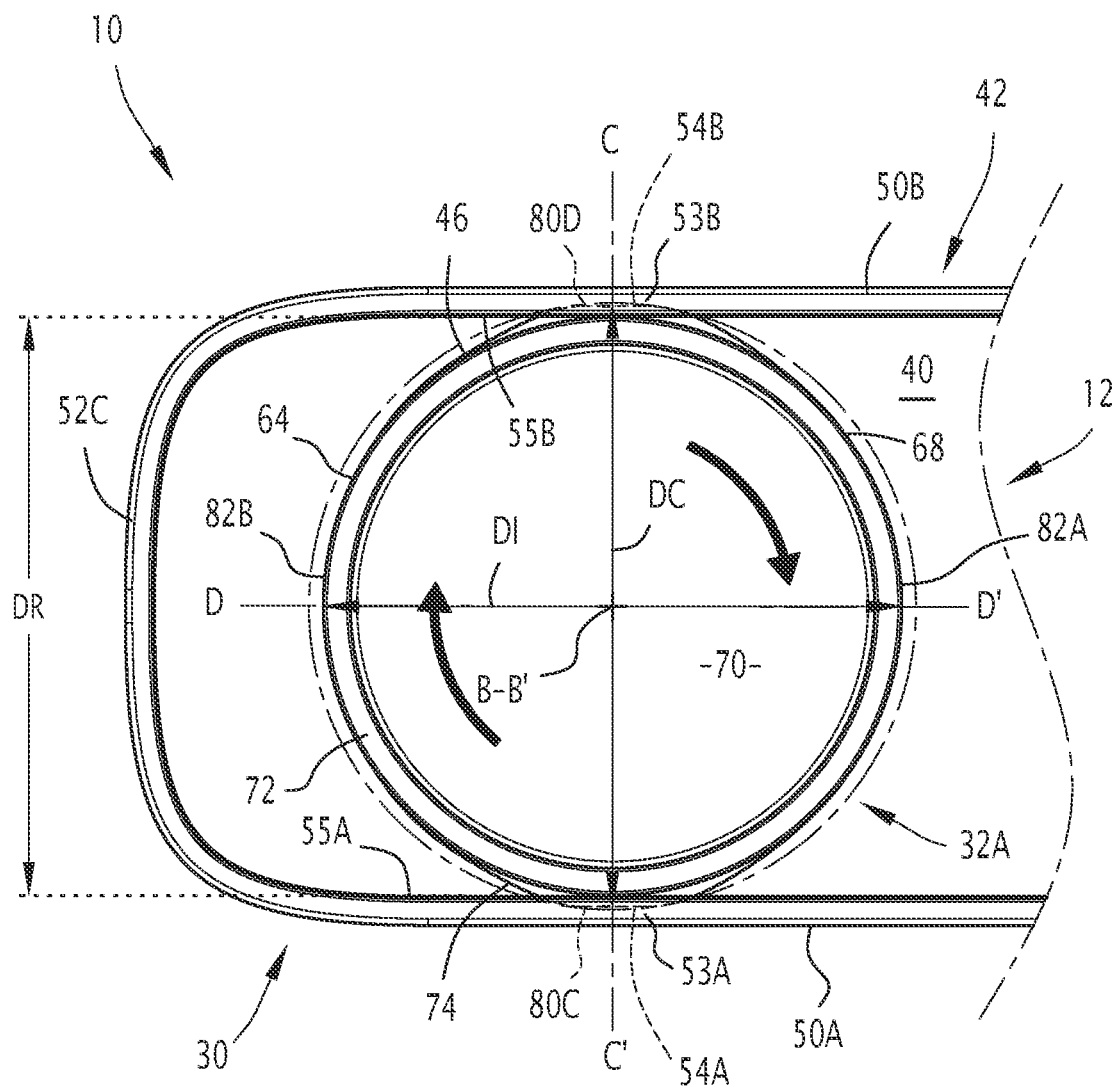
FIG. 5 is a view similar to FIG. 3, with the object in the attachment position.

The accessory holder 32A, 32B is suitable for being rotated by a user about the central axis B-B' between the installation position in the interface 30 thereby defined, and the attachment position on the attachment region 46, as can be seen in FIG. 5.

Such displacement is performed e.g. by sliding the lower surface 66 over the attachment region 46. The rotation is suitable for moving the contact regions 80C, 80D from a configuration without contact with the interference surfaces 54A, 54B and more generally with the ledge 42, to a configuration of contact between the contact regions 80C, 80D, and the interference surfaces 54A, 54B. In such configuration, the contact regions 80C, 80D are inserted in the respective grooves 53A, 53B, being wedged under the respective protruding parts 55A, 55B.

Such displacement is potentially accompanied by a compression of the seal 74 modifying the external contour so as to adapt the maximum distance DC to the minimum distance separating the first interference surface 54A from the second interference surface 54B.

In the attachment position, the contact between each contact region 80C, 80D and the opposite interference surface 54A, 54B, potentially accompanied by the local compression of the seal 74 provides a reversible attachment of the accessory holder 32A, 32B to the interface 30.

Thereby, when the device 10 is used, the user brings the object 12 opposite the interface 30, then introduces the object into the interface 30 by placing the insertion regions 82A, 82B opposite the interference surfaces 54A, 54B and bringing the lower surface 66 into contact with the attachment region 46, in the installation position.

The user then pivots the object 12 about the central axis B-B' to the attachment position and thus inserts the contact regions 80C, 80D into the grooves 53A, 53B, and activates the contact between the contact regions 80C, 80D and the respective interference surfaces 54A, 54B.

The angle of rotation of the object 12 about the central axis B-B' between the installation position and the attachment position is generally greater than 20° and is comprised in particular between 60° and 120°, preferentially substantially equal to 90°.

If the user wants to release the object 12, the user pivots the object 12 again about the central axis B-B' in one direction or in the other, so as to replace the insertion regions 82A, 82B facing the interference surfaces 54A, 54B and the contact regions 80C, 80D outside the grooves 53A, 53B, away from the ledge 42.

The user can then extract the object 12 away from the interface 30, by moving the lower surface 66 away from the attachment region 46.

It is thus extremely simple for the user to reversibly attach an object 12 in the interface 30, and then release the object.

Figure 4:
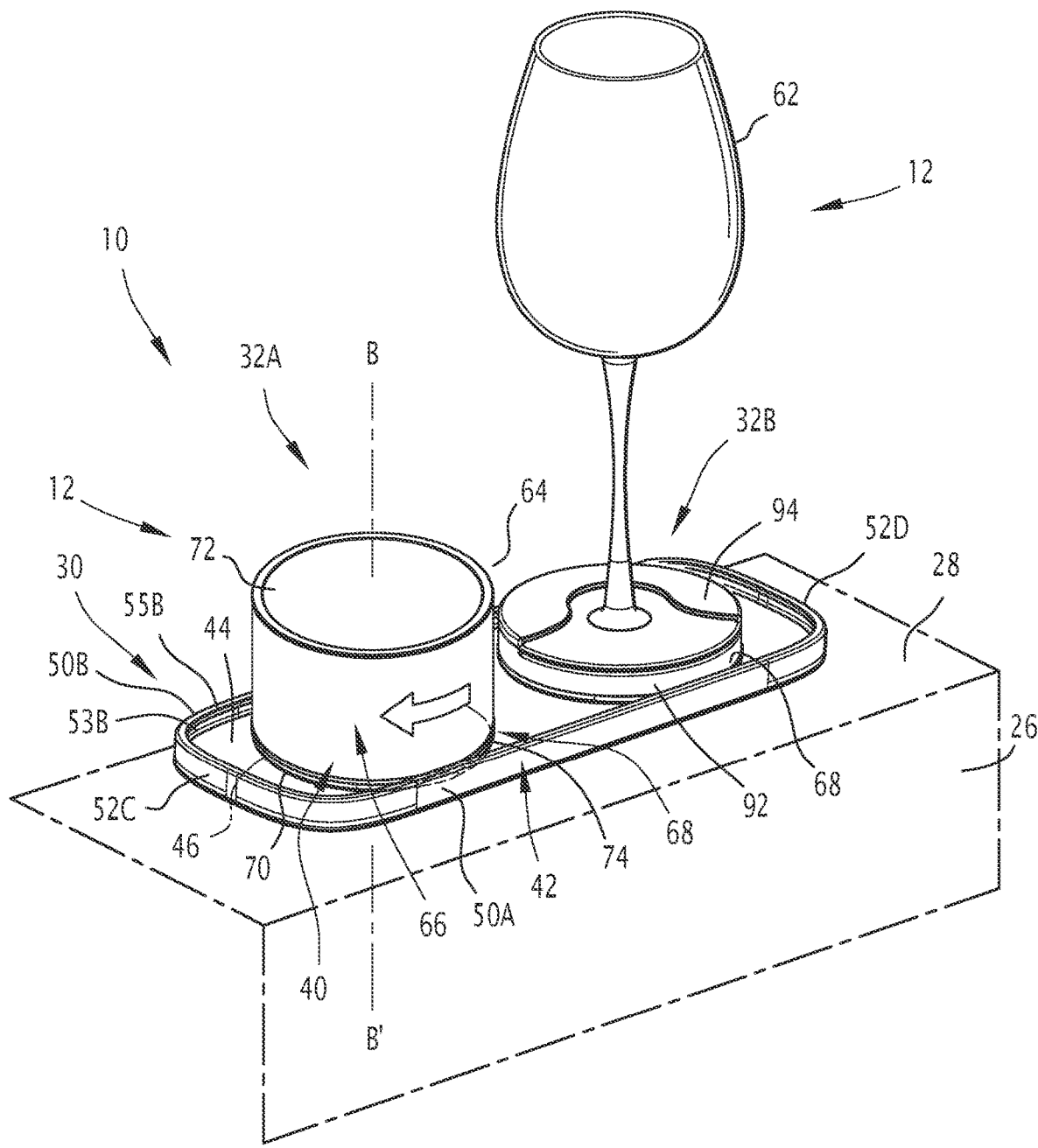
FIG. 4 is a view similar to FIG. 2, with the object in an attachment position.

The accessory holder 32B shown in FIGS. 2 and 4 differs from the accessory holder 32A shown in the same figures in that it is provided with a yoke 94 for wedging a glass foot which can press against the upper surface of a glass foot. The yoke 94 extends opposite a disk 92 defining along with the tab 90, a slot for clamping the glass base.

Figure 6:
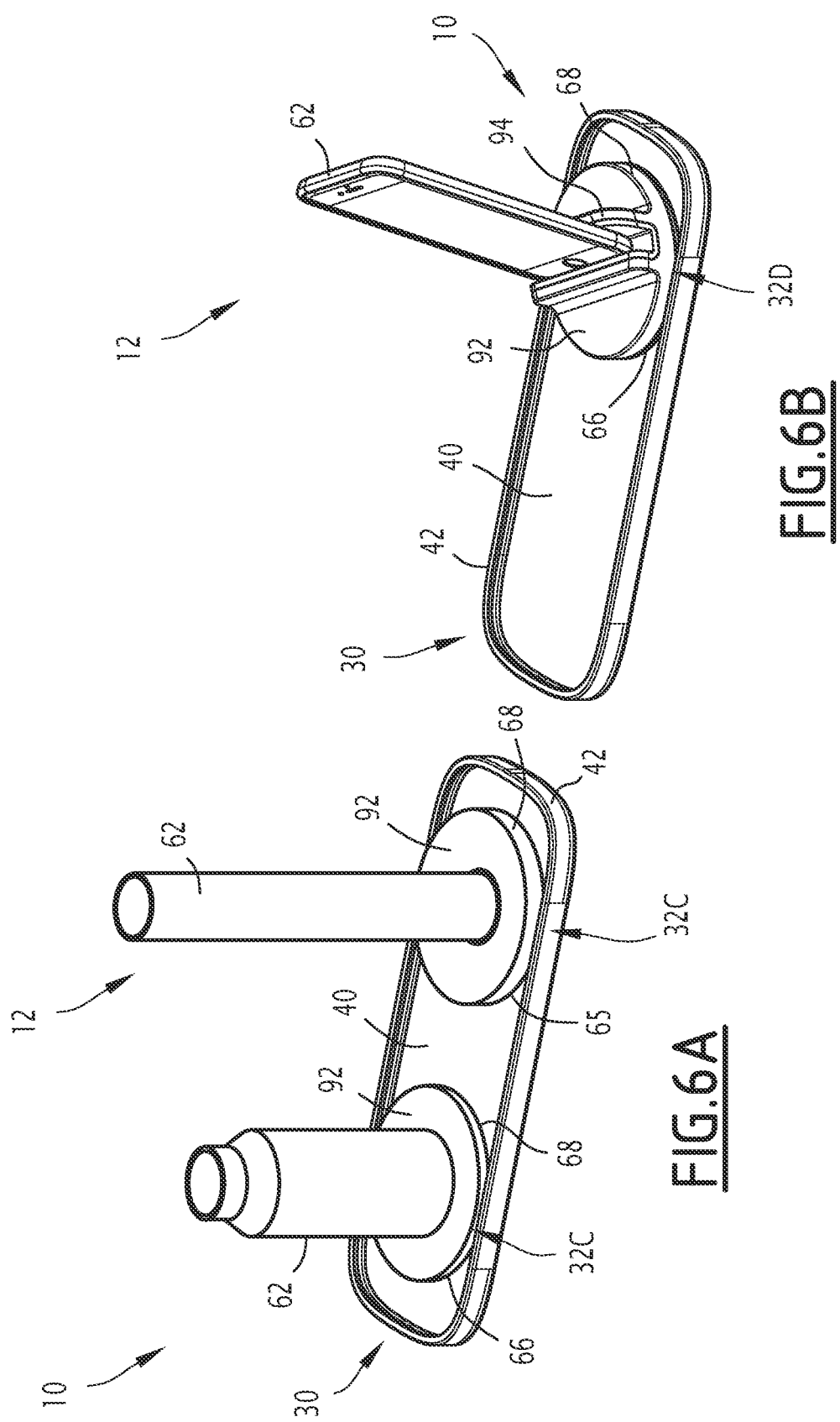
FIGS. 6A and 6B are a perspective view of different accessories including a lighting device and a portable electronic device.

The accessory holders 32C, 32D shown in FIGS. 6A and 6B are each formed by a disk 92 defining the lower surface 66, and on the edge thereof, the outer peripheral surface 68. The disk 92 supports the accessory 62 which can be attached permanently onto the holder 32C, 32D.

In the example shown in FIG. 6A, the accessory 62 is e.g. a lighting device, such as a lamp.

In example shown in FIG. 6B, the accessory 62 comprises a yoke 94 for receiving the accessory 62, defining a slot 96 for wedging the accessory 62. The accessory 62 is in particular, a portable electronic device, such as a mobile phone or a tablet.

In another variant (not shown), the object 12 is directly an accessory 62 provided with a lower surface 66 intended for pressing against the attachment region 46 and with a lateral surface 68 defining contact regions 80C, 80D intended for pressing against the interference surfaces 54A, 54B, respectively, of the ledge 42.

Figure 7:
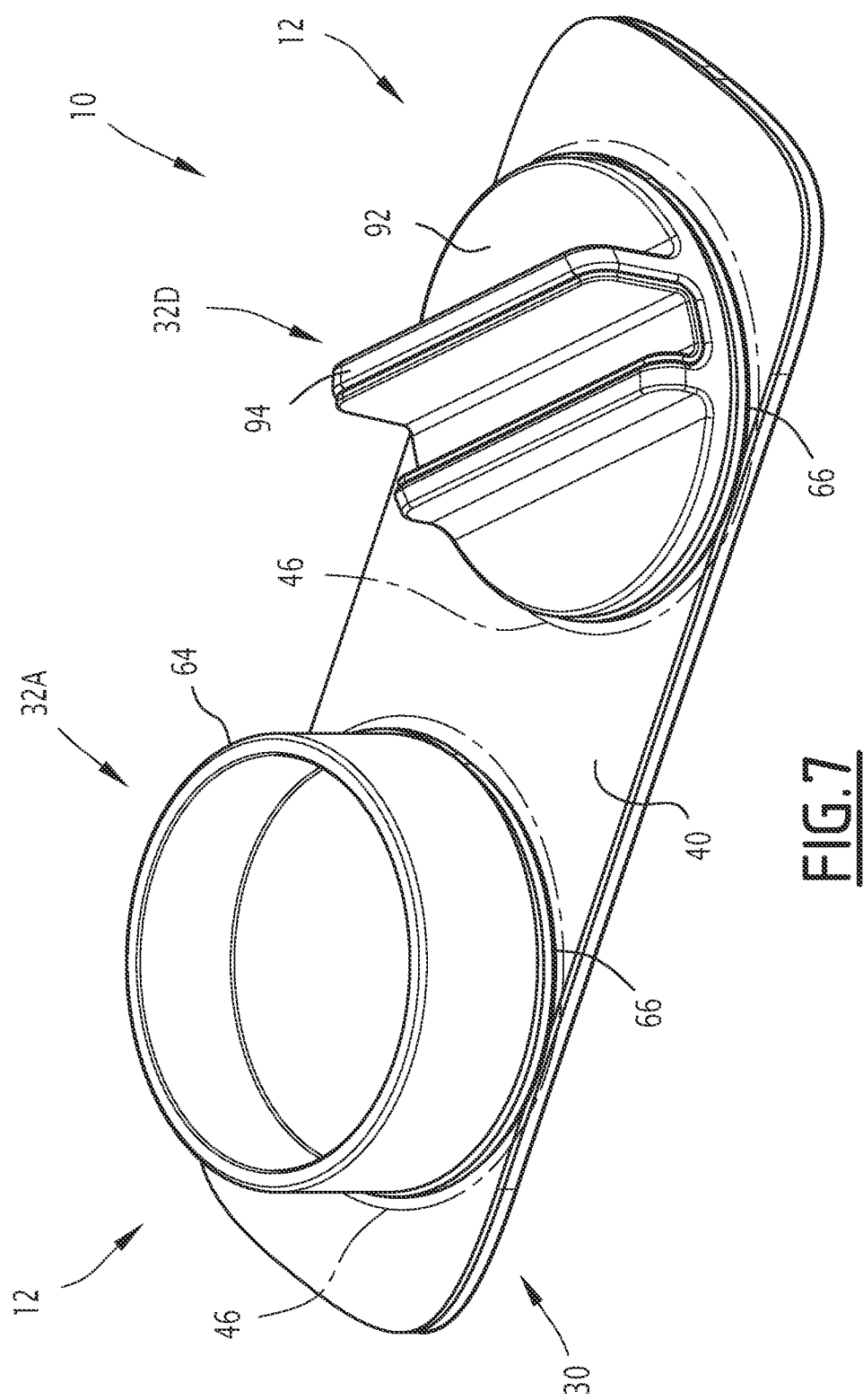
FIG. 7 is a perspective view of a second holding system according to the present disclosure.
Figure 8:
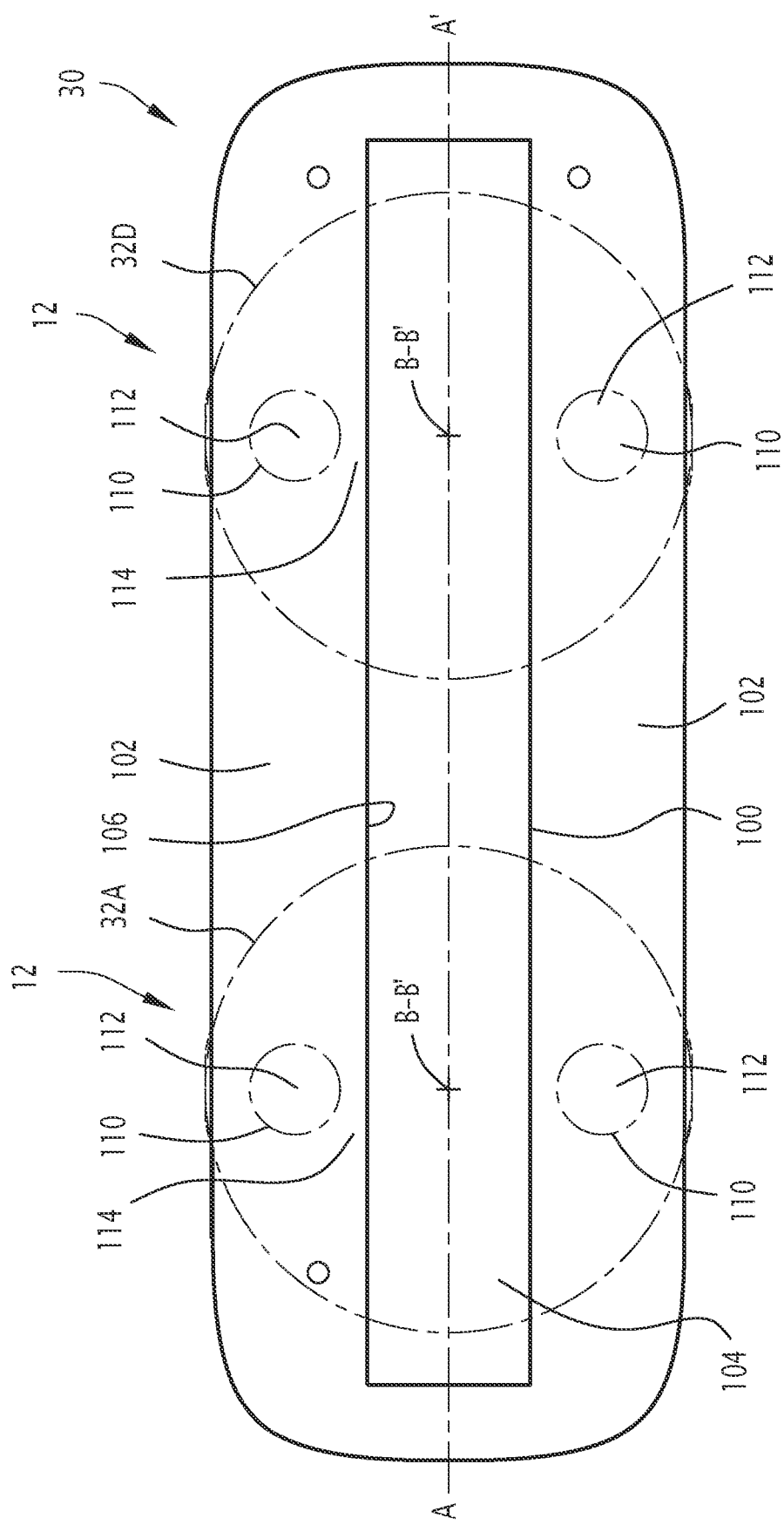
FIG. 8 is a bottom view of the system shown in FIG. 7, in a position for installing the object.
Figure 9:
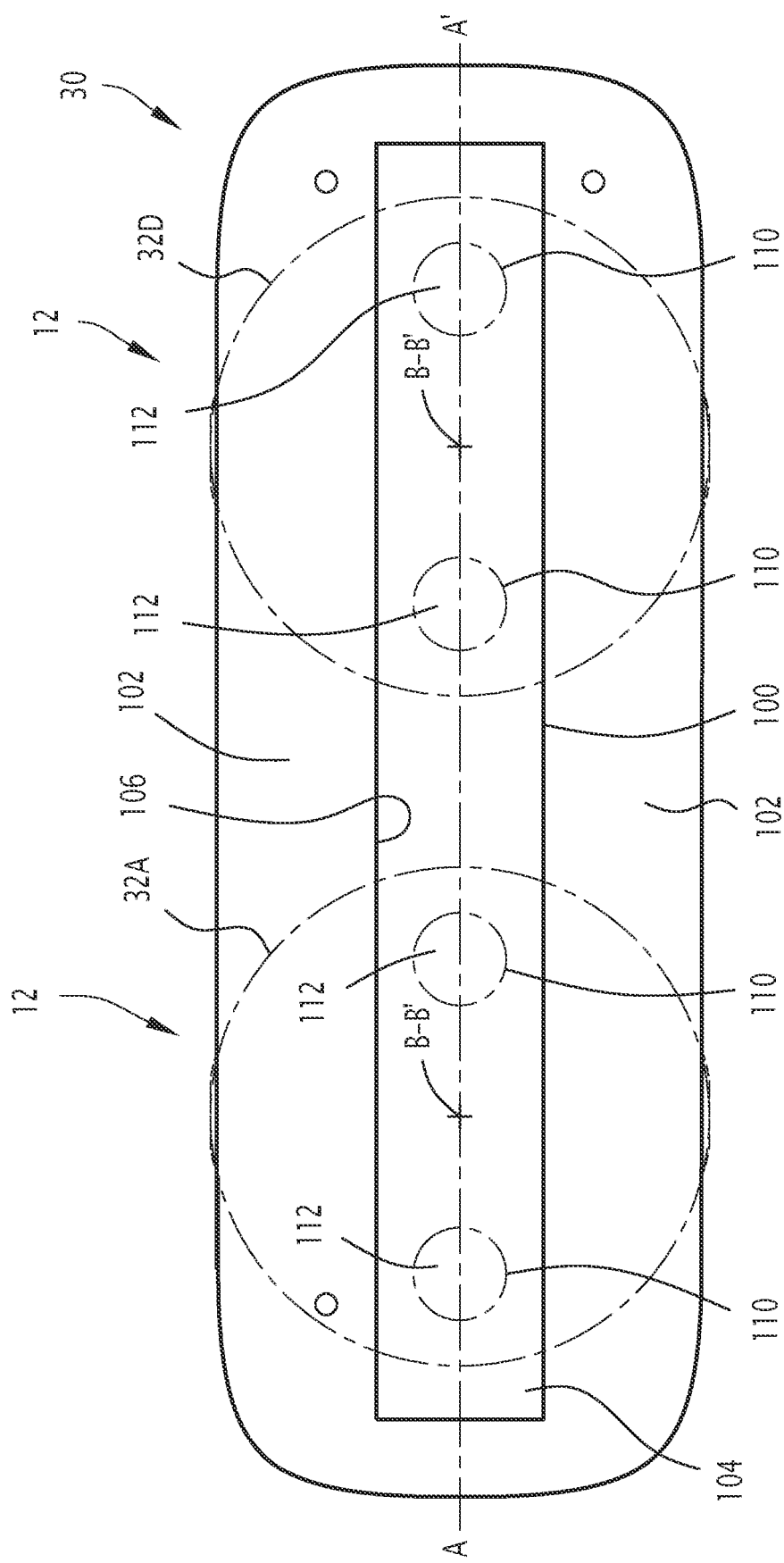
FIG. 9 is a view similar to FIG. 8, in an attachment position for the object.

In the variant illustrated by FIGS. 7 to 9, the interface 30 advantageously has no ledge 42.

The interface 30 includes a first magnetic interaction zone 100 with the object 12. The first magnetic interaction zone 100 is e.g. formed by a strip extending longitudinally over a portion of the width of the interface 30 facing the attachment region 46.

The interface 30 includes, at the periphery of the zone 100, a zone 102 with no magnetic interaction with the object 12.

The first magnetic interaction zone 104 is e.g. formed by a permanent magnet 104 received in a housing 106 defined under the bottom of the interface 30. In a variant, the magnet 104 is replaced by a zone suitable for being magnetized by a permanent magnet, e.g. made of a ferromagnetic material.

Each object 12 comprises at least a second magnetic interaction zone 110 with the interface 30. It comprises, between the or each zone 110, a zone 114 with no magnetic interaction with the interface 30.

In the example shown in FIG. 8, each second magnetic interaction zone 110 is off-center with respect to the central axis B-B'. Each zone 110 is herein defined by a permanent magnet 112, or by a material suitable for being magnetized, such as a ferromagnetic material.

In the present example, the second magnetic interaction zone 110 is arranged under the bottom wall 70, between the axis B-B' and the periphery of the bottom wall 70.

The object 12 advantageously includes two zones of magnetic interaction 110 diametrically opposite with respect to the axis B-B', which define therebetween a zone with no magnetic interaction 114.

The zone with no magnetic interaction 114 has a width, between the two zones 110, greater than the width of the first magnetic interaction zone 100 on the interface 30.

Thus, the object 12 is suitable for being inserted by the user into an insertion position, wherein the overlap, taken as a projection onto a plane perpendicular to the axis B-B', between the first magnetic interaction zone 110 on the interface 30 and each second magnetic interaction zone 110 on the object 12, is minimal or zero.

In the example shown in FIG. 8, in the insertion position, the first interaction zone 100 is situated in the intermediate space 114 in-between the second interaction zones 110. The overlap between the zone 100 and each zone 110 is zero.

Then, as before, the user is able to pivot the object 12 about the axis B-B' thereof, for increasing and then maximizing the overlap between the first magnetic interaction zone 100 and each second magnetic interaction zone 110. Thereby, the object 12 is attached by magnetic interaction between the first zone 100. The overlap between the zone 100 and each zone 110 is then maximum.

In the examples described hereinabove, the interface 30 extends horizontally. In a variant, the interface extends either vertically or obliquely.

The way the holding system 10 according to the present disclosure works is particularly simple for the user, while providing robust attachment which meets in particular, the safety requirements during taxiing, take-off and/or landing.

In a variant (not shown), the object 12 includes at least one electrical conduction path having a terminal situated on a contact region 80C, 80D. The electrical conduction path is suitable for being connected to a piece of equipment consuming electrical power, e.g. a battery of an accessory or a battery charger, by direct contact or by induction, supported by the object 12.

The interface 30 further includes an additional electrical conduction path having an additional terminal situated on an interference region 54A, 54B. The additional path is e.g. connected to an electrical power source.

In the installation position of the object 12, the terminal and the additional terminal are situated away from each other. The conduction path is electrically disconnected from the additional conduction path and the piece of equipment consuming electrical power is not electrically supplied by the power source.

When the object 12 is moved to the attachment position thereof, the terminal comes into contact with the additional terminal, electrically connecting the conduction path to the additional conduction path. The piece of equipment consuming electrical power is then electrically supplied by the power source via the conduction paths.

In a variant, the terminal is situated on the lower surface 66 of the object 12 and the supplementary terminal is situated on the bottom 40 of the interface 30.

In yet another variant, the interference region 54A, 54B receives a switch which is open in the position wherein the object 12 is placed and which closes when the object 12 is moved into the attachment position thereof, in order to trigger the electrical supply to a piece of equipment, in particular a battery charger.

Figure 10:
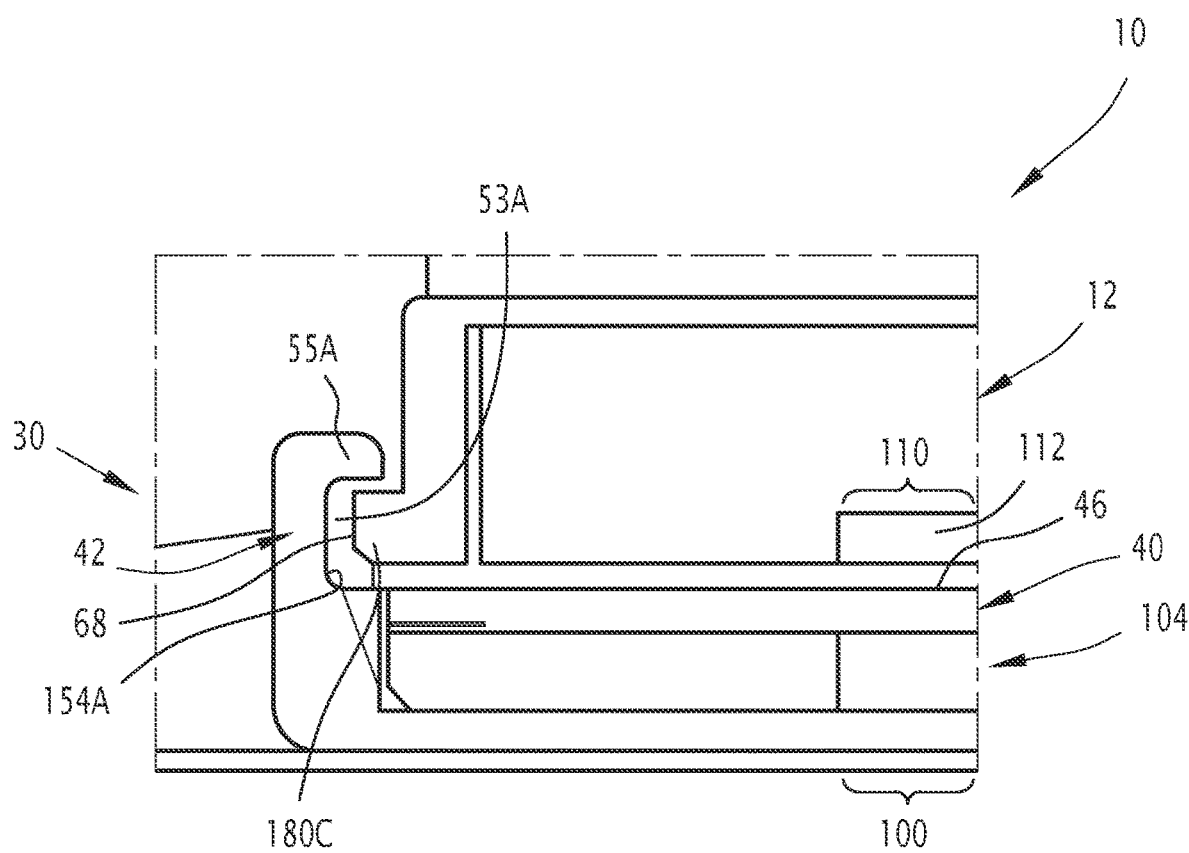
FIG. 10 is a view of an alternate embodiment of FIG. 7.

An alternative embodiment of the device 10 of FIGS. 7 through 9 is illustrated in FIG. 10.

The interface 30 includes, as in FIGS. 7 through 9, a first magnetic interaction zone 100 including a first permanent magnet 104 or/and a first zone capable of being magnetized by a permanent magnet.

The interface 30 includes a bottom 40 defining the attachment region 46, and a ledge 42 projecting from the bottom 40.

The ledge 42 defines at least one groove 53A and a protruding part 55A covering the groove 53A away from and above the bottom 46

The object 12 has a peripheral surface 68 having, in the attachment position, at least a first radially protruding region 180C inserted into the groove 53A below the protruding portion 55A in the attachment position and being located outside the groove 53A in the installation position.

The object 12 further has at least a second magnetic interaction zone 110, the second magnetic interaction zone 110 including a second permanent magnet 112, or a second zone susceptible to being magnetized by a permanent magnet.

As before, the overlap between the first magnetic interaction zone 100 and the second magnetic interaction zone 110 is minimal or zero in the installation position. Conversely, the overlap between the first magnetic interaction zone 100 and the second magnetic interaction zone 110 is maximum in the fixing position.

In the attachment position, the first region 180C inserted into the groove 53A under the protruding portion 55A is disposed away from and facing the protruding part 55A and/or facing and away from the vertical surface 154A of the ledge 42 projecting from the attachment region 46 between the attachment region 46 and the protruding part 55A.

Thus, the placement of the first region 180 in the groove 53A of the ledge 42, upon rotation of the object 12 on the bottom 40, ensures that the object 12 remains retained vertically in the event of an inadvertent disconnection of the magnetic connection between the first magnetic interaction zone 100 and the second magnetic interaction zone 110.

Nevertheless, the absence of contact of the first region 180C with the protruding portion 55A or/and with the vertical surface 154A does not interfere with the movement of the object 12 between its installation position and its attachment position, making the gestural use simple for the user.

Furthermore, in an alternative embodiment of the examples in FIGS. 7 to 10, when the object 12 is inserted by the user into the interface 30 in the insertion position, it is configured to spontaneously pivot about its B-B' axis toward the attachment position, without user action. This spontaneous pivoting results from the magnetic interaction between the first magnetic interaction zone 100 and each second magnetic interaction zone 110 tending to maximize their overlap.

What is claimed is:

1. An object holding device in an aircraft cabin, comprising:
    at least one interface, to be attached to a wall of the cabin, or to be formed in a wall of the cabin, the interface defining an object attachment region; and
    an object being configured to be placed in contact with the attachment region, the object being mobile in rotation on the attachment region between an installation position to place the object on the attachment region, in which the object is movable away from the attachment region, and an attachment position of the object on the attachment region, in which the object is held on the attachment region;

the interface has a first interference surface protruding with respect to the attachment region, a second interference surface protruding with respect to the attachment region, situated opposite and away from the first interference surface, the object having a peripheral surface having, in the attachment position, a first contact region with the first interference surface and a second contact region with the second interference surface, the first contact region and the second contact region being arranged away from the first interference surface and from the second interference surface in the installation position;

the peripheral surface has at least one section with a deformable contour, the contour being deformed at the first contact region and at the second contact region in the attachment position.

2. The device according to claim 1, wherein the rotation of the object between the installation position and the attachment position is at least 20°.

3. The device according to claim 1, wherein the object has a flat lower surface, the interface having a flat attachment region, the object being mobile in rotation on the attachment region by sliding the lower surface on the attachment region.

4. The device according to claim 1, wherein the interface includes a bottom defining the attachment region, and a ledge protruding with respect to the bottom.

5. The device according to claim 4, wherein the ledge delimits at least one groove and a protruding part covering the at least one groove.

6. The device according to claim 5, wherein the object has a peripheral surface having, in the attachment position, at least a first region being inserted into the groove below the protruding part in the attachment position and being situated outside the groove in the installation position.

7. The device according to claim 1, wherein the peripheral surface comprises at least one section having an elongated outer contour along an elongation axis, the elongation axis running through the first contact region and the second contact region.

8. The device according to claim 1, wherein the object comprises an annular seal defining in part the peripheral surface delimiting the deformable contour of the peripheral surface.

9. The device according to claim 1, wherein the interface includes a bottom defining the attachment region, and a ledge protruding with respect to the bottom, the ledge defining the first interference surface and the second interference surface.

10. The device according to claim 9, wherein the ledge delimits at least one groove and a protruding part covering the at least one groove, the first contact region being inserted into the groove below the protruding part in the attachment position and being situated outside the groove in the installation position.

11. The device according to claim 1, wherein the interface includes a first magnetic interaction zone including a first permanent magnet and/or a first zone configured to be magnetized by a permanent magnet, the object having at least one second magnetic interaction zone, the at least one second magnetic interaction zone including a second permanent magnet, or a second zone configured to be magnetized by a permanent magnet, an overlap between the first magnetic interaction zone and the at least one second magnetic interaction zone being minimal or zero in the installation position, the overlap between the first magnetic interaction zone and the at least one second magnetic interaction zone being maximum in the attachment position.

12. The device according to claim 11, wherein the first magnetic interaction zone extends along a first longitudinal axis, the at least one second magnetic interaction zone extending along a second longitudinal axis, the longitudinal axis of the first magnetic interaction zone and the axis of the at least one second magnetic interaction zone coinciding in the attachment position and intersecting in the installation position.

13. The device according to claim 11, wherein the interface includes a bottom defining the attachment region, and a ledge protruding with respect to the bottom, the ledge delimiting at least one groove and a protruding part covering the at least one groove, wherein the object has a peripheral surface having, in the attachment position, at least a first region being inserted into the groove below the protruding part in the attachment position and being situated outside the groove in the installation position, wherein in the attachment position, the first region is positioned away and facing the protruding part or/and is positioned away and facing the surface of the ledge protruding with regards to the attachment region between the attachment region and the protruding part.

14. The device according to claim 1, wherein the object is an accessory holder, or wherein the object is an accessory.

* * * * *